United States Patent
Kim et al.

(10) Patent No.: US 7,092,141 B2
(45) Date of Patent: Aug. 15, 2006

(54) ACTUATOR FOR TILTING REFLECTING MIRROR OF DIGITAL MICROMIRROR DEVICE FOR DIGITAL LIGHT PROCESSING TYPE PROJECTION

(75) Inventors: Jae Kyung Kim, Kyungki-do (KR); Chil Sung Lee, Kyungki-do (KR); Dong Won Choi, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 11/115,238

(22) Filed: Apr. 27, 2005

(65) Prior Publication Data

US 2006/0132888 A1 Jun. 22, 2006

(30) Foreign Application Priority Data

Dec. 16, 2004 (KR) ............... 10-2004-0107087

(51) Int. Cl.
  *G02B 26/00* (2006.01)
(52) U.S. Cl. .................. 359/290; 291/223; 291/298
(58) Field of Classification Search ........... 359/223, 359/224, 290–295, 298
See application file for complete search history.

(56) References Cited

U.S. PATENT DOCUMENTS

| | | | | |
|---|---|---|---|---|
| 4,973,145 A | * | 11/1990 | Kirkwood et al. | 359/223 |
| 5,110,195 A | * | 5/1992 | Loney | 359/224 |
| 5,777,807 A | * | 7/1998 | Bar et al. | 359/224 |
| 6,288,816 B1 | * | 9/2001 | Melville et al. | 359/223 |
| 6,422,704 B1 | * | 7/2002 | Gyoten et al. | 353/122 |
| 6,775,043 B1 | * | 8/2004 | Leung et al. | 359/224 |
| 6,989,921 B1 | * | 1/2006 | Bernstein et al. | 359/290 |
| 2005/0231782 A1 | * | 10/2005 | Bennett et al. | 359/224 |

* cited by examiner

*Primary Examiner*—Evelyn A. Lester
(74) *Attorney, Agent, or Firm*—Lowe Hauptman & Berner, LLP.

(57) ABSTRACT

A reflecting mirror tilting actuator comprises a base having an inner space defined therein, a mirror holder having a fixing part fixed to the base and a horizontal part integrally connected with the fixing part by a resilient connection part, the mirror holder being provided with at least one resilient member for resiliently supporting the reflecting mirror upward, a mirror supporting unit having a cover attached to the horizontal part and a mirror stopper disposed between the horizontal part and the cover, a tilting unit having an actuating member whose upper end comes into contact with the horizontal part and a tilting stopper whose upper end comes into contact with the horizontal part, and a horizontal adjusting unit having at least one adjustment screw, whose lower end contacts the mirror stopper through at least one adjustment hole formed at the cover, for adjusting flatness of the reflecting mirror.

19 Claims, 13 Drawing Sheets

SECTION A-A

SECTION B-B

SECTION C-C

SECTION D-D (a)

(b)

SECTION I-I

ACTUATOR FOR TILTING REFLECTING MIRROR OF DIGITAL MICROMIRROR DEVICE FOR DIGITAL LIGHT PROCESSING TYPE PROJECTION

RELATED APPLICATIONS

The present application is based on, and claims priority from, Korean Application Number 2004–107087, filed Dec. 16, 2004, the disclosure of which is incorporated by reference herein in its entirety.

BACKGROUND OF THE INVENTION

1. Field of the Invention

The present invention relates to an actuator for tilting a reflecting mirror of a digital micromirror device (hereinafter, referred to as "DMD") for digital light processing (hereinafter, referred to as "DLP") type projection, and, more particularly to an actuator for tilting a reflecting mirror of a DMD for DLP type projection that is capable of more accurately adjusting flatness of the reflecting mirror, which is tilted by the reflecting mirror tilting actuator according to the present invention, and of more conveniently performing flatness adjustment.

2. Description of the Related Art

Recently, large-sized high-definition displays have been increasingly popularized. For example, projection televisions and projectors have been developed and commercialized as the large-sized high-definition displays.

Each of the projection televisions and the projectors commonly includes an optical engine. In the optical engine is mounted a display unit for displaying signal-processed image information, such as a cathode ray tube (hereinafter, referred to as "CRT"), a liquid crystal display (hereinafter, referred to as "LCD"), a liquid crystal on silicon (hereinafter, referred to as "LCoS"), and a DMD.

A projection system adopting the CRT, which is usually used, forms desired images through very small bright cathode ray tubes and projects them through a lens. However, the CRT has several problems in that the brightness is low, adjustment of deflection based on frequencies is difficult, and adjustment of focus is difficult. As a result, the use of the CRT has been gradually decreased.

As the display units become miniaturized and lightened, a projection system adopting the LCD has been put on the markets, which is replaced with the projection system adopting the CRT, which is heavy and thick. In addition, other projection systems adopting the LCoS or the DMD have been put on the market or increasingly developed.

At present, LCD type projection systems are most widely used. However, the DLP type projection system using the DMD, which is excellent in realizing high contrast and fast in development speed as compared to the LCoS, which is advantageous in realizing high definition but slow in development speed, is now being developed and put on the markets.

The CRT and the LCD are display units that are driven by analog signals, and therefore, digital signals are converted into analog signals at the final signal-processing stage, and then the converted signals are displayed. On the other hand, the DMD is driven through pulse width modulation of digital signals without digital to analog conversion. Consequently, the DMD has the advantage in that errors generated during digital to analog conversion are minimized, and therefore, the DLP type projection systems using the DMD are in the spotlight of the recent projection systems.

FIG. 9 is a view illustrating the structure of a conventional DLP type projection system 1. As shown in FIG. 9, the conventional DLP type projection system 1 comprises: an illuminating optical system 1a; a reflecting type display unit 1b; and a projecting optical system 1c.

The illuminating optical system 1a comprises: a light source 10; and an optical lens 20 for illuminating light output from the light source to the reflecting type display unit 1b.

The light source 10 comprises: a lamp for generating light; and a reflector for reflecting the generated light to guide a route of the light.

The optical lens 20 comprises: a condensing lens 21 for condensing light output from the light source 10; and a shaping lens 23 for changing the condensed light into uniform light to shape the light in a predetermined pattern.

Between the condensing lens 21 and the shaping lens 23 is disposed a color wheel 22, which is rotated in one direction by a driving source (not shown) for selecting color light having a predetermined color and transmitting the selected color light. The color wheel 22 has a plurality of color filters, which are arranged in the circumferential direction of the color wheel 22 while being uniformly spaced apart from each other.

The display unit 1b, to which the light output from the illuminating optical system 1a is illuminated, comprises a DMD 30. The DMD 30 is mounted on a substrate 33, on which a processor 31 and a memory 32 are also mounted. The DMD 30 serves to separate a light route of the illuminating optical system 1a from a light route of the projecting optical system 1c based on tilting angles.

The DMD 30 is a projection type display unit using an optical semiconductor, which has been developed by Texas Instrument Incorporated in the United States of America. Specifically, the DMD 30 comprises a plurality of reflecting mirrors, each having a very small size, disposed on a silicon wafer in two dimensions. Each reflecting mirror corresponds to each pixel. The DMD 30 controls the light reflected by the reflecting mirrors to display pictures.

Each reflecting mirror is tilted by a reflecting mirror tilting actuator at high frequency, for example, tilted every 10 μs, for switching an incident light route between two states (ON and OFF) to reflect the incident light.

When the reflecting mirror corresponding to each predetermined pixel is tilted by the reflecting mirror tilting actuator such that the reflecting mirror is in the ON state, the light reflected by the reflecting mirror is magnified through a projection lens 40 of the projecting optical system 1c to illuminate the magnified light onto a screen 50. When the reflecting mirror is tilted by the reflecting mirror tilting actuator such that the reflecting mirror is in the OFF state, on the other hand, the light reflected by the reflecting mirror is away from the projection lens 40 of the projecting optical system 1c with the result that the light is not illuminated onto the screen 50.

Consequently, the digital micromirror device 30 changes the reflecting angle of the light by independently tilting the reflecting mirrors according to an image signal based on each pixel to turn the light ON/OFF, and illuminates the images magnified by the projection lens 40 onto the screen 50 in large size.

The reflecting mirror tilting actuator tilts the reflecting mirror to a tilting angle of from approximately −10 to +10 degrees in a cycle of 60 Hz to guide the light reflected on the reflecting mirror to a predetermined direction. At this time, it is necessary that flatness of the reflecting mirror be accurately adjusted to below 1.2 μm.

After assembly of the reflecting mirror and the reflecting mirror tilting actuator is completed, however, it is difficult to accurately adjust flatness of the reflecting mirror to below 1.2 μm. Furthermore, flatness adjustment is very difficult.

SUMMARY OF THE INVENTION

Therefore, the present invention has been made in view of the above problems, and it is an object of the present invention to provide an actuator for tilting a reflecting mirror of a DMD for DLP type projections that is capable of more accurately adjusting flatness of the reflecting mirror, which is tilted to turn a light route ON/OFF, and of more conveniently performing flatness adjustment.

It is another object of the present invention to provide an actuator for tilting a reflecting mirror of a DMD for DLP type projection that is capable of preventing a tilting stopper from being displaced due to an external force to tilt the reflecting mirror to a predetermined tilting angle and stopping the tilted reflecting mirror, thereby improving reliability of the product.

In accordance with the present invention, the above and other objects can be accomplished by the provision of an actuator for tilting each of reflecting mirrors disposed, in two dimensions according to the number of pixels, on a digital micromirror device (DMD) for digital light processing (DLP) type projection such that each reflecting mirror changes a reflecting angle of the light according to an image signal, wherein the actuator comprises: a base having an inner space defined therein; a mirror holder comprising a fixing part fixed to the base, and a horizontal part integrally connected with the fixing part by a resilient connection part, the mirror holder being provided with at least one resilient member for resiliently supporting the reflecting mirror upward; a mirror supporting unit comprising a cover attached to the upper surface of the horizontal part, and a mirror stopper disposed between the horizontal part and the cover while surrounding the frame of the reflecting mirror; a tilting unit comprising an actuating member, whose upper end comes into contact with the horizontal part, for transmitting vertical reciprocating movement to the horizontal part, and a tilting stopper, whose upper end comes into contact with the horizontal part, for restricting the tiling angle of the horizontal part; and a horizontal adjusting unit comprising at least one adjustment screw, whose lower end contacts the mirror stopper through at least one adjustment hole formed at the cover such that the mirror stopper spaced apart by a predetermined gap from the horizontal part is exposed upward through the adjustment hole, for adjusting flatness of the reflecting mirror.

Preferably, the base is provided at the bottom surface thereof with circular protrusions for fixing the position of the mirror holder, and insertion holes for allowing the actuating member and the tilting stopper to be inserted therethrough.

Preferably, the resilient connection part is disposed between the upper end of the fixing part and the lower surface of the horizontal part, the resilient connection part having a thickness less than that of the upper end of the fixing part.

Preferably, the horizontal part is provided at the corners thereof with a plurality of screw holes for allowing screw members for attaching the cover to the horizontal part to be inserted therethrough.

Preferably, the horizontal part has at least one cutout part formed by cutting at least one corner. More preferably, the at least one cutout part comprises a plurality of cutout parts arranged while being bilaterally symmetrical to each other about the center line of the upper surface of the horizontal part.

Preferably, the horizontal part is provided at the upper surface thereof with a location part having the same shape as the reflecting mirror, the location part having a predetermined depth.

Preferably, the horizontal part is provided at the lower surface thereof with a hollow guide member for guiding the vertical reciprocating movement of the actuating member.

Preferably, the horizontal part is provided at the lower surface thereof with a touch member whose lower surface contacts the upper end of the tilting stopper. More preferably, the touch member is provided at the lower surface thereof with a groove corresponding to the upper end of the tilting stopper.

Preferably, the horizontal part is provided at the lower surface thereof with a groove corresponding to the upper end of the tilting stopper.

Preferably, the upper end of the tilting stopper is round.

Preferably, the actuating member comprises a piezoelectric element whose upper end is vertically reciprocated to a predetermined height along the flow direction of electric current when the piezoelectric element is supplied with the electric current.

Preferably, the actuating member is provided at the upper end thereof with a cap having a semicircular section, and the horizontal part is provided at the lower surface thereof with a contact groove having a semicircular section, the cap being engaged in the contact groove while the cap is in surface contact with the contact groove.

Preferably, the cover has an opening for allowing the reflecting mirror to be exposed therethrough, and the opening is provided at the inner surface thereof with an inner engaging protrusion, the inner engaging protrusion being engaged with the outer frame of the mirror stopper.

Preferably, the mirror stopper has an opening for allowing the reflecting mirror to be exposed therethrough, the opening being provided at the inner surface thereof with an inner step for engaging with the outer frame of the reflecting mirror, and the mirror stopper is provided at the outer surface thereof with an outer step for engaging with the cover.

Preferably, the at least one adjustment hole comprises a plurality of adjustment holes formed at the middle parts of the sides of the cover, respectively, or a plurality of adjustment holes formed at the corners of the cover, respectively. More preferably, the plurality of adjustment holes are arranged in bilateral symmetry.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
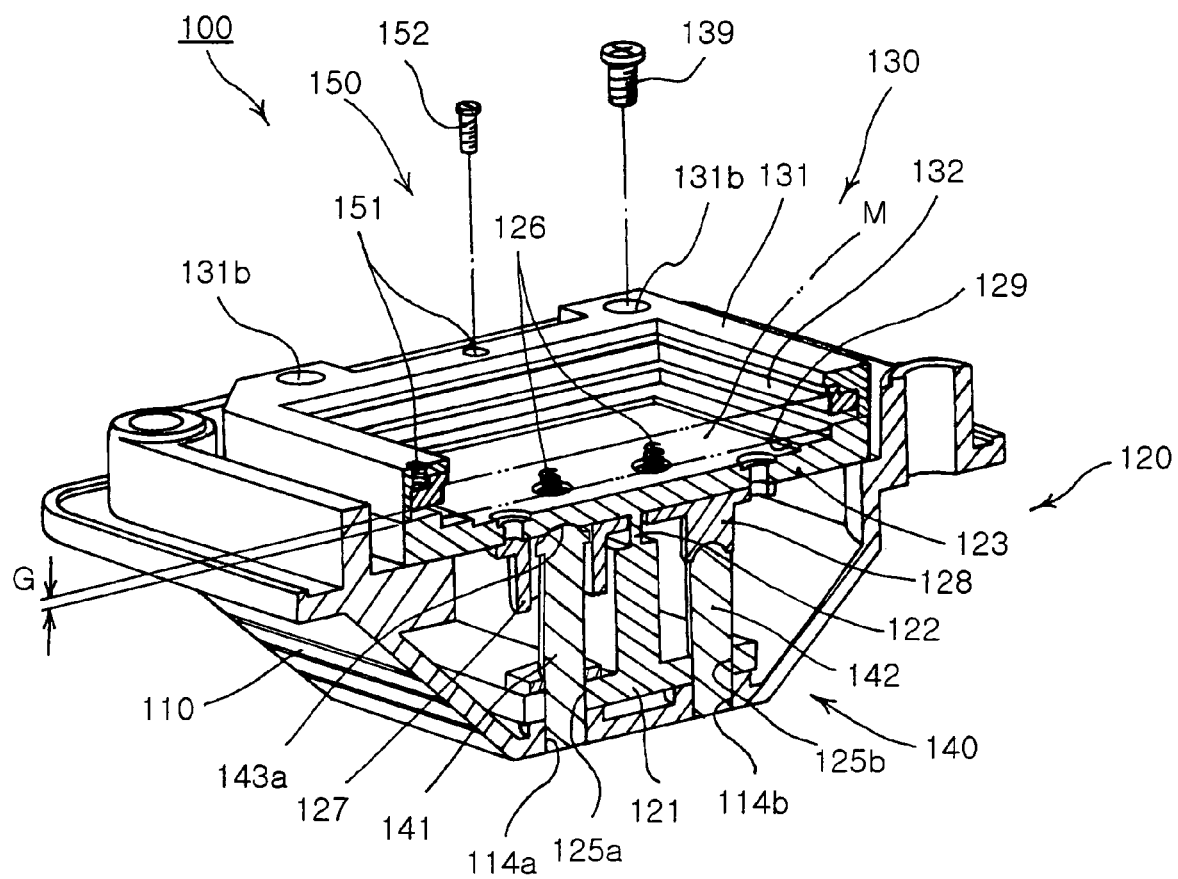
FIG. 1 is a perspective view illustrating an actuator for tilting a reflecting mirror of a DMD for DLP type projection according to the present invention.
Figure 2A:
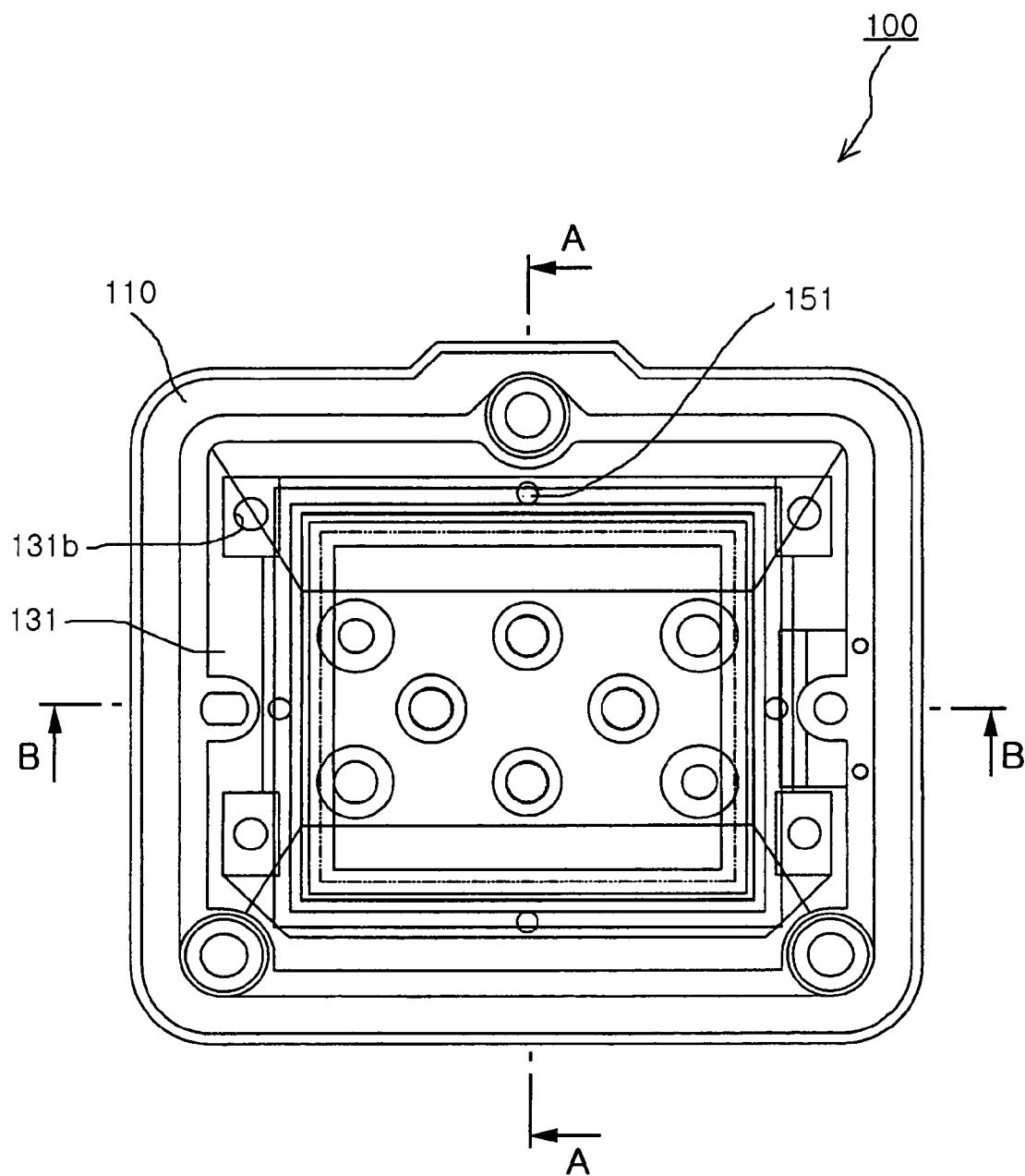
FIG. 2A is a plan view of the reflecting mirror tilting actuator according to the present invention.
Figure 2B:
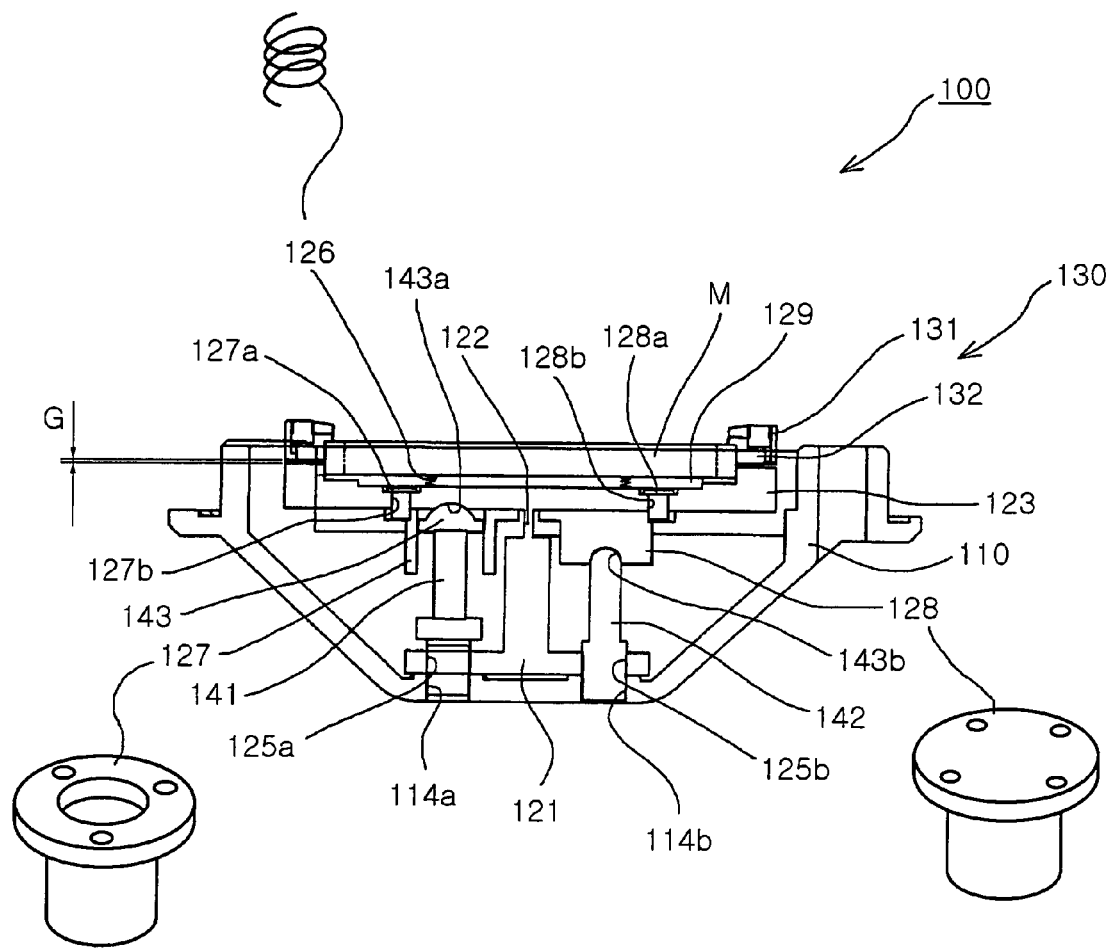
FIG. 2B is a sectional view taken along the line A—A of FIG. 2A.
Figure 2C:
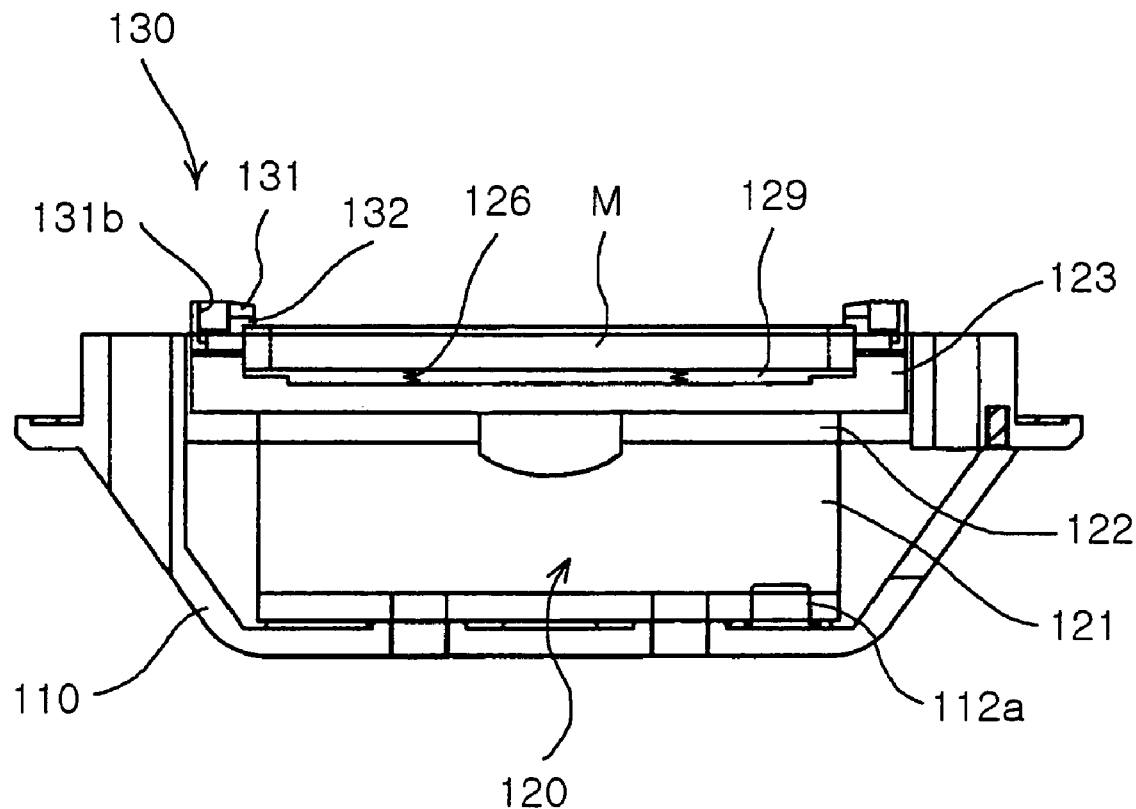
FIG. 2C is a sectional view taken along the line B—B of FIG. 2A.
Figure 3A:
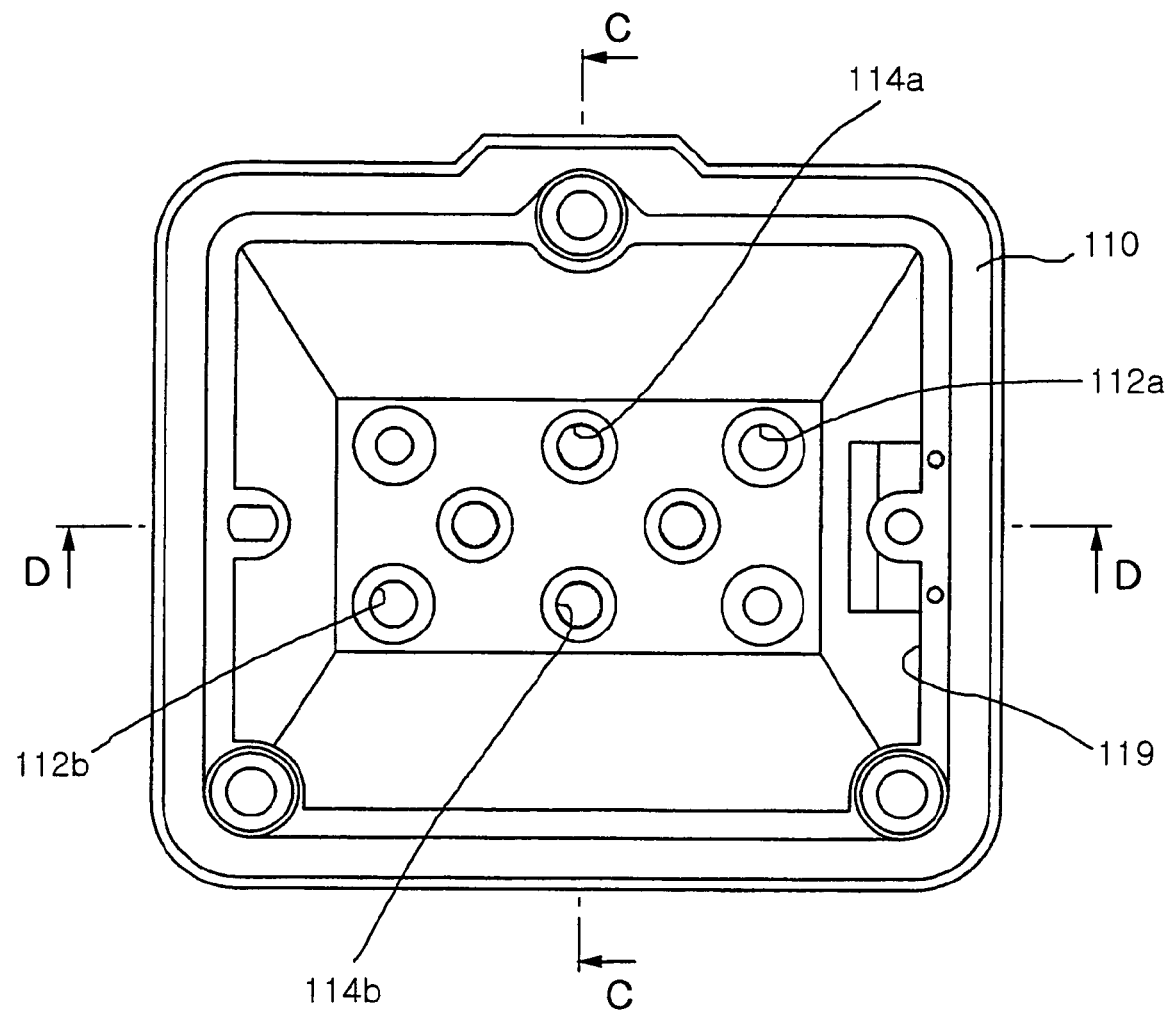
FIG. 3A is a plan view illustrating a base of the reflecting mirror tilting actuator according to the present invention.
Figure 3B:
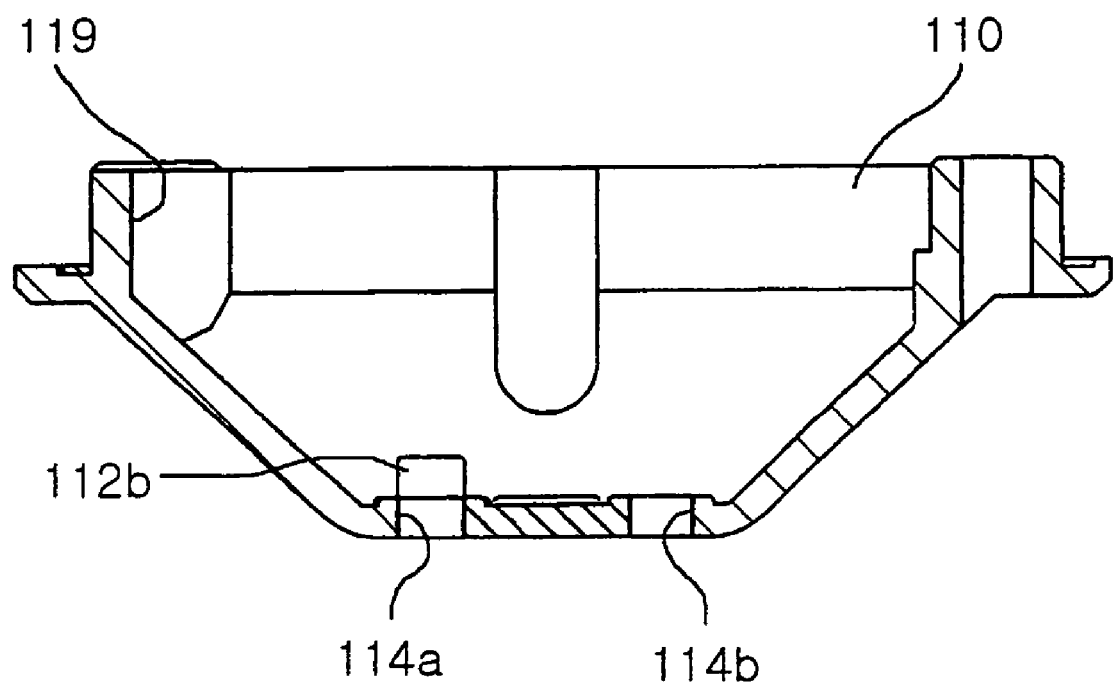
FIG. 3B is a sectional view taken along the line C—C of FIG. 3A.
Figure 3C:
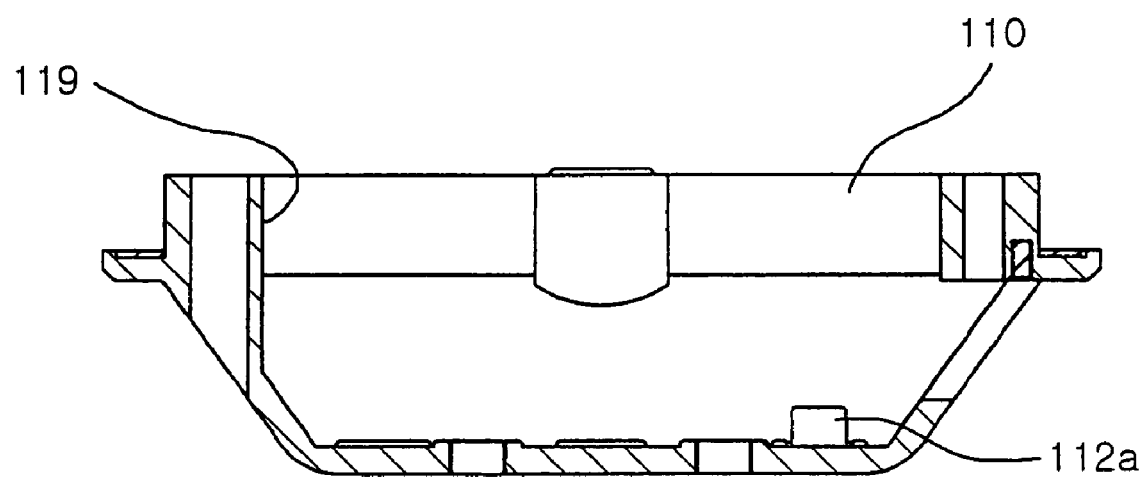
FIG. 3C is a sectional view taken along the line D—D of FIG. 3A.
Figure 4:
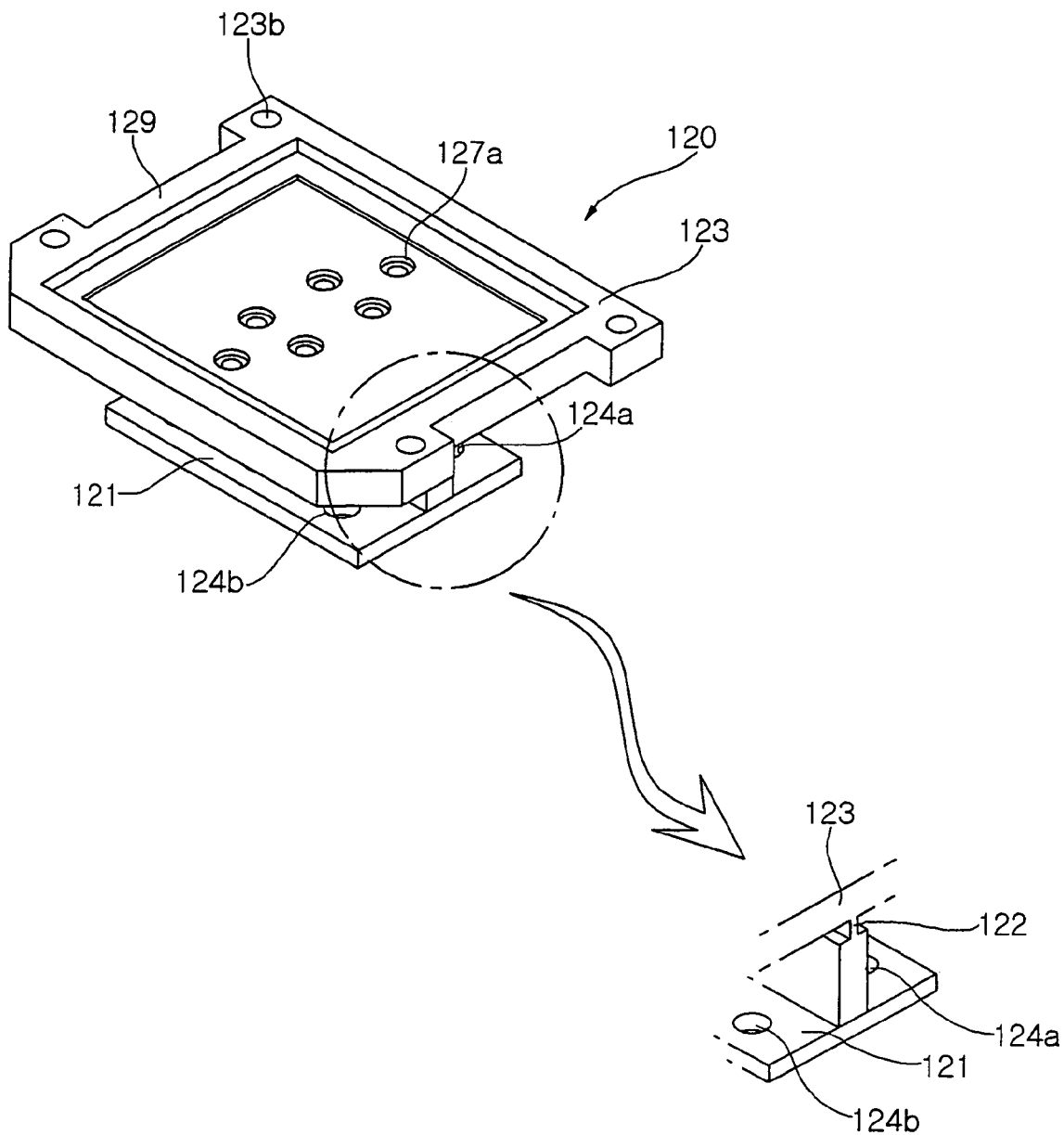
FIG. 4 is a perspective view illustrating a mirror holder of the reflecting mirror tilting actuator according to the present invention.
Figure 5:
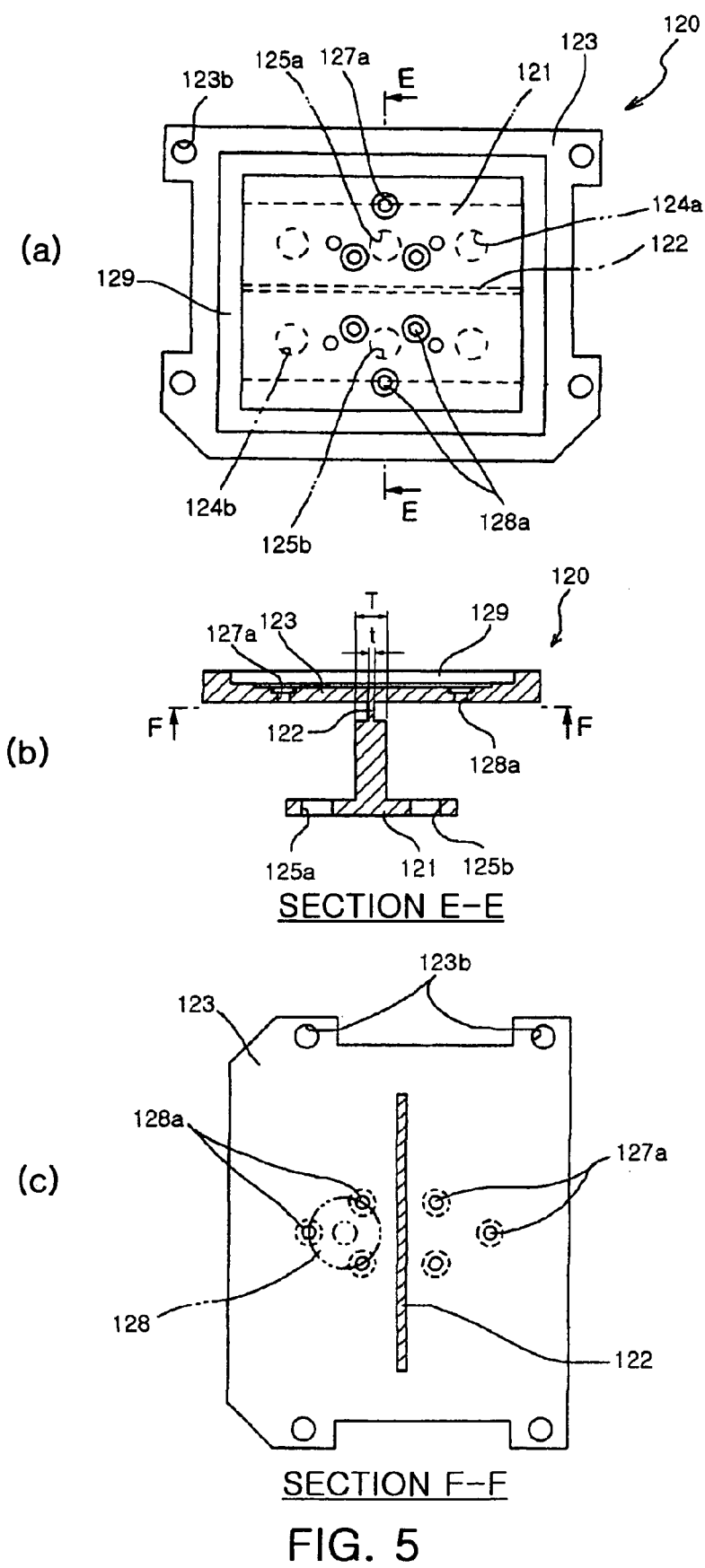
FIG. 5A is a plan view of the mirror holder shown in FIG. 4.
FIG. 5B is a sectional view taken along the line E—E of FIG. 5A.
FIG. 5C is a sectional view taken along the line F—F of FIG. 5B.

FIG. 1 is a perspective view illustrating an actuator 100 for tilting a reflecting mirror of a DMD for DLP type projection according to the present invention. FIG. 2A is a plan view of the reflecting mirror tilting actuator 100 according to the present invention, FIG. 2B is a sectional view taken along the line A—A of FIG. 2A, and FIG. 2C is a sectional view taken along the line B—B of FIG. 2A.

As shown in FIGS. 1 and 2A to 2C, the reflecting mirror tilting actuator 100, serving to independently tilt each reflecting mirror M disposed in two dimensions on a digital micromirror device, while corresponding to the number of pixels, for producing digital light, and to accurately and conveniently adjust flatness of the reflecting mirror M, which turns a light route ON/OFF, comprises: a base 110; a mirror holder 120; a mirror supporting unit 130; a tilting unit 140; and a horizontal adjusting unit 150.

As shown in FIGS. 1 to 3C, the base 110 is a fixed structure having an upper part, which is provided with a rectangular frame-shaped opening 119, and a lower part, which is closed, by which an inner space having a predetermined size is defined.

At the inner bottom surface of the base 110 are formed a plurality of circular protrusions 112a and 112b, which are protruded upward to a predetermined height for fixing the position of the mirror holder 120. Through the middle of the bottom part of the base 110 are formed a plurality of insertion holes 114a and 114b, through which an actuating member 141 and a tilting stopper 142, which constitutes the tilting unit 140, are inserted.

As shown in FIGS. 1, 2A, 2B, 2C, 4, 5A, 5B, and 5C, the mirror holder 120, which is disposed in the base 110, comprises a fixing part 121, resilient connection part 122, and a horizontal part 123, which are integrated to form an approximately H-shaped section. The mirror holder 120 is a lightweight structure made of aluminum or metal alloy containing aluminum.

The fixing part 121 is provided with a plurality of circular holes 124a and 124b, in which the plurality of circular protrusions 112a and 112b formed at the inner bottom surface of the base 110 are inserted, respectively. The fixing part 121 is also provided with a plurality of insertion holes 125a and 125b, which correspond to the plurality of insertion holes 114a and 114b of the base 110, respectively.

The resilient connection part 122 is disposed between the upper end of the fixing part 121 and the lower surface of the horizontal part for generating a resilient restoring force necessary to return the horizontal part 123 to its horizontal state after the horizontal part 123 is tilted to a predetermined angle relative to the fixing part 121, the position of which is fixed. Preferably, the resilient connection part 122 has a thickness t less than the thickness T of the upper end of the fixing part 121.

The horizontal part 123 is provided at the upper surface thereof with at least one resilient member 126 for resiliently supporting the reflecting mirror M upward. Preferably, the resilient member 126 comprises a spring having the upper end constantly contacting the lower surface of the reflecting mirror M and the lower end constantly contacting the upper surface of the horizontal part 123.

When the resilient member 126, which serves to resiliently support the reflecting mirror M upward, comprises a spring, the horizontal part 123 is provided at the upper surface thereof with screw holes 127a and 128a, in which a guide member 127 and a touch member 128, which will be described below, are inserted, respectively, in order to stably maintain the position of the resilient member 126. Alternatively, the horizontal part 123 may be provided at the upper surface thereof with a plurality of additional grooves.

The resilient member 126 may comprise a plate-shaped rubber, having the upper surface contacting the lower surface of the reflecting mirror M and the lower surface contacting the upper surface of the horizontal part 123, for generating a resilient restoring force when the resilient member 126 is vertically compressed, instead of the spring, which requires additional grooves necessary to stably maintain the position of the resilient member 126.

The horizontal part 123, at which the resilient member 126 is disposed, is provided at the upper surface thereof with a location part 129 having the same rectangular shape as the reflecting mirror M. The location part 129 is depressed to a predetermined depth such that the reflecting mirror M is securely located in the location part 129. At the corners of the horizontal part 123 are formed a plurality of screw holes 123b, respectively, through which screw members 139 are inserted to attach a cover 131, which will be described below, to the horizontal part 123.

Figure 6:
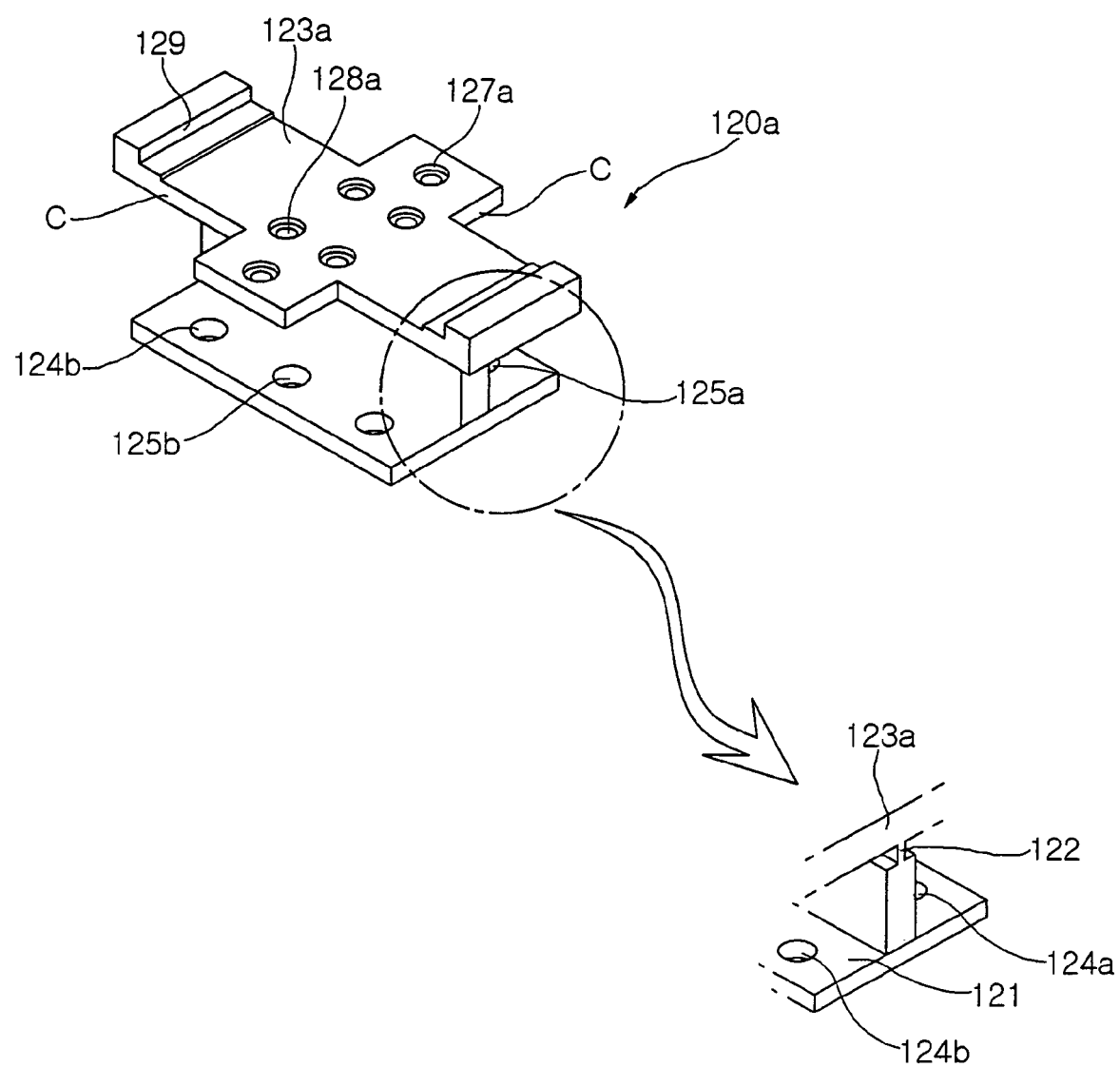
FIG. 6 is a perspective view illustrating another mirror holder of the reflecting mirror tilting actuator according to the present invention.
Figure 7:
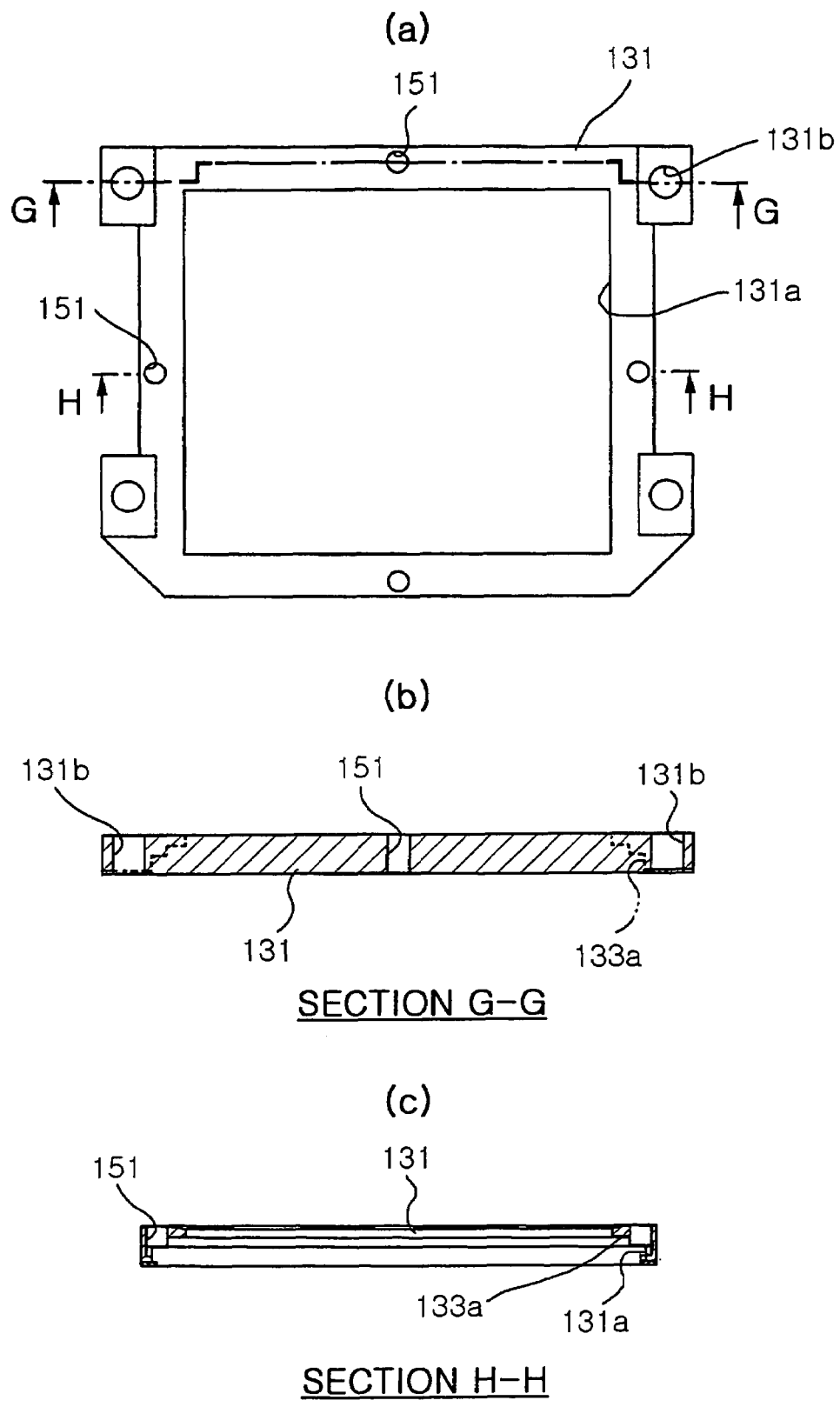
FIG. 7A is a plan view illustrating a cover of the reflecting mirror tilting actuator according to the present invention.
FIG. 7B is a sectional view taken along the line G—G of FIG. 7A.
FIG. 7C is a sectional view taken along the line H—H of FIG. 7A.
Figure 8:
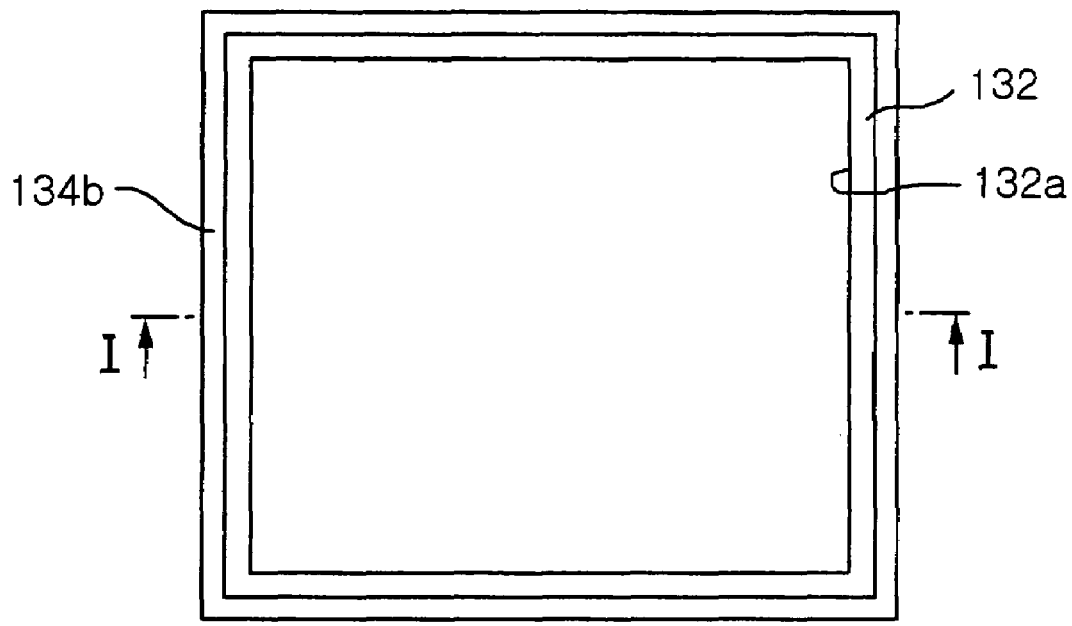
FIG. 8A is a plan view illustrating a mirror stopper of the reflecting mirror tilting actuator according to the present invention.
FIG. 8B is a sectional view taken along the line I—I of FIG. 8A.
Figure 8:
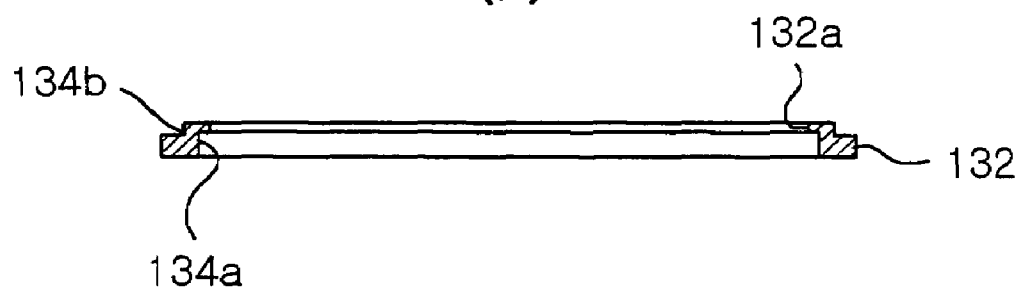

FIG. 6 is a perspective view illustrating another mirror holder 120a of the reflecting mirror tilting actuator according to the present invention. As shown in FIG. 6, a horizontal part 123a of the mirror holder 120a has a cutout part C formed by cutting at least one corner in the shape of a rectangular section such that the weight of the mirror holder 120a is decreased.

Preferably, a plurality of cutout parts C are arranged while being bilaterally symmetrical to each other about the center line of the upper surface of the horizontal part 123a.

In this case, the weight of the mirror holder 120 is further decreased due to the cutout parts C, and therefore, the horizontal part 123a of the mirror holder 120a is more quickly returned to its original position, i.e., to its horizontal state, after the horizontal part 123a of the mirror holder 120a is tilted. Consequently, noise due to contact between the actuating member 141 and the horizontal part 123a, which is generated when the actuating member 141 is returned to its original position more quickly than the horizontal part 123a is returned to its original position, is minimized.

Through the lower surface of the horizontal part 123 are formed a plurality of screw holes 127b, through which guide member-fixing screw members 127a are inserted, respectively, such that the hollow guide member 127, serving to guide the vertical reciprocating movement of the actuating member 141, is attached to the horizontal part 123. Through the lower surface of the horizontal part 123 are also formed a plurality of screw holes 128b, through which touch member-fixing screw members 128a are inserted, respectively, such that the touch member 128, whose lower surface contacts the upper end of the tilting stopper 142, is attached to the horizontal part 123.

Also, the hollow guide member 127 and the touch member 128 are provided with a plurality of screw holes, through which the screw members 127a and 128a are also inserted, respectively.

As shown in FIGS. 1, 2A to 2C, 7A to 7C, 8A and 8B, the mirror supporting unit 130, serving to support the reflecting mirror M, comprises a cover 131 and a mirror stopper 132. The cover 131 has a rectangular opening 131a, through which the reflecting mirror M is exposed upward. Also, the cover 131 is formed in the shape of a rectangular frame having approximately the same size as the upper frame of the horizontal part 123.

At the inner surface of the opening 131a is formed an inner engaging protrusion 133a, which is engaged with the outer frame of the mirror stopper 132.

At the corners of the cover 131 are formed screw holes 131b, which correspond to the screw holes 123b formed at the corners of the horizontal part 123. When the cover 131 is attached to the horizontal part 123, the screw members 139 are inserted into the screw holes 123b of the horizontal part 123 through the screw holes 131b of the cover 131. At this time, the lower surface of the cover 131 comes into surface contact with the upper surface of the horizontal part 123.

When the cutout parts C are formed at the corners of the horizontal part 123a, as shown in FIG. 6, a "["-shaped fixing member (not shown) is resiliently inserted inward from the outside of the horizontal part 123a and the cover 131, after the cover 131 is disposed on the horizontal part 123a, such that the upper surface of the horizontal part 123a comes into surface contact with the lower surface of the cover 131. In this way, the cover 131 of the mirror supporting unit 130 is attached to the horizontal part 123 of the mirror holder 120a.

The mirror stopper 132 has a rectangular opening 132a, through which the rectangular reflecting mirror M is exposed upward. At the inner surface of the opening 132a is formed an inner step 134a, with which the outer frame of the reflecting mirror M is engaged such that the reflecting mirror M is prevented from being easily separated from the opening 132a. At the outer surface of the mirror stopper 132 is formed an outer step 134b, with which the inner engaging protrusion 133a is engaged.

The mirror stopper 132 is disposed between the horizontal part 123 of the mirror holder 120 and the cover 131 of the mirror supporting unit 130 while being parallel with the bottom surface of the horizontal part 123. A predetermined gap is formed between the lower surface of the mirror stopper 132 and the upper surface of the horizontal part 123 such that the mirror stopper 132 can be vertically moved along with the reflecting mirror M disposed in the opening 132a while the mirror stopper 132 is resiliently supported upward by the resilient member 126.

As shown in FIGS. 1 and 2A to 2C, the tilting unit 140, serving to tilt the reflecting mirror a predetermined angle to a reference horizontal plane, comprises an actuating member 141 and a tilting stopper 142, by which the horizontal part 123, to which the cover 131 is attached, is tilted to a predetermined angle.

The actuating member 141 is securely attached to the base 110 and the mirror holder 120 through the insertion holes 114a and 125a. When the actuating member 141 is supplied with electric current, the actuating member 141 repeatedly transmits vertical movement to the horizontal part 123 while the upper end of the actuating member 141 is in contact with the lower surface of the horizontal part 123 for tilting the horizontal part 123 to a predetermined angle about the resilient connection part 122.

The upper end of the actuating member 141 contacts the lower surface of the horizontal part 123 through the hollow guide member 127 attached to the lower surface of the horizontal part 123. At the upper end of the actuating member 141 is integrally formed a cap 143 having a semicircular section, by which the contact area is increased when the upper end of the actuating member 141 contacts with the lower surface of the horizontal part 123. The horizontal part 123 is provided at the lower surface thereof with a contact groove 143a having a semicircular section. The cap 143 is engaged in the contact groove 143a while the cap 143 is in surface contact with the contact groove 143a.

Preferably, the actuating member 141 comprises a piezoelectric element whose upper end is vertically reciprocated to a predetermined height along the flow direction of electric current when the piezoelectric element is supplied with the electric current.

The tilting stopper 142 is securely attached to the base 110 and the mirror holder 120 through the insertion holes 114b and 125b while the lower end of the tilting stopper 142 is vertically disposed. The tilting stopper 142 is formed in the shape of a rod having a predetermined length. The upper end of the tilting stopper 142 contacts the lower surface of the horizontal part 123 for restricting a tilting angle of the reflecting mirror M.

The tilting stopper 142 may be disposed such that the upper end of the tilting stopper 142 directly contacts the lower surface of the horizontal part 123 or the upper end of the tilting stopper 142 contacts the touch member 128 attached to the lower surface of the horizontal part 123.

At the lower surface of the horizontal part 123 corresponding to the upper end of the tilting stopper 142 or at the lower surface of the touch member 128 corresponding to the upper end of the tilting stopper 142 is formed a groove 143b for absorbing impacts. Preferably, the upper end of the tilting stopper 142 is round to minimize impact and noise generated when the upper end of the tilting stopper 142 contacts the horizontal part 123 or the touch member 128.

The horizontal adjusting unit 150 changes the gap G between the horizontal part 123 and the mirror stopper 132 in at least one position to adjust flatness of the reflecting mirror M. Through the cover 131, serving to support the mirror holder 120 and the mirror stopper 132, is formed at least one adjustment hole 151, through which the upper surface of the mirror stopper 132, spaced apart by the determined gap G from the uppermost surface of the horizontal part 123 disposed in the mirror holder 120, is exposed upward.

In the adjustment hole 151 is inserted an adjustment screw 152 having a predetermined length such that the lower end of the adjustment screw 152 contacts the upper surface of the mirror stopper 132.

The adjustment hole 151 is formed at the middle of each side constituting the rectangular frame of the cover 131. Alternatively, the adjustment hole 151 may be formed at each corner of the cover 131 at the position where the screw hole 131b of the cover 131 is not formed.

Preferably, a plurality of adjustment holes 151 are formed at the cover 131 such that the adjustment holes 151 are arranged in bilateral symmetry.

Consequently, when the adjustment screws 152 inserted in the corresponding adjustment holes are tightened or loosened, the gap G between the mirror stopper 132 of the mirror supporting unit 130 and the horizontal part 123 of the mirror holder 120 is decreased or increased, and therefore, flatness of the reflecting mirror M is adjusted according to the reference horizontal plane at the uppermost end of the base 110.

Figure 9:
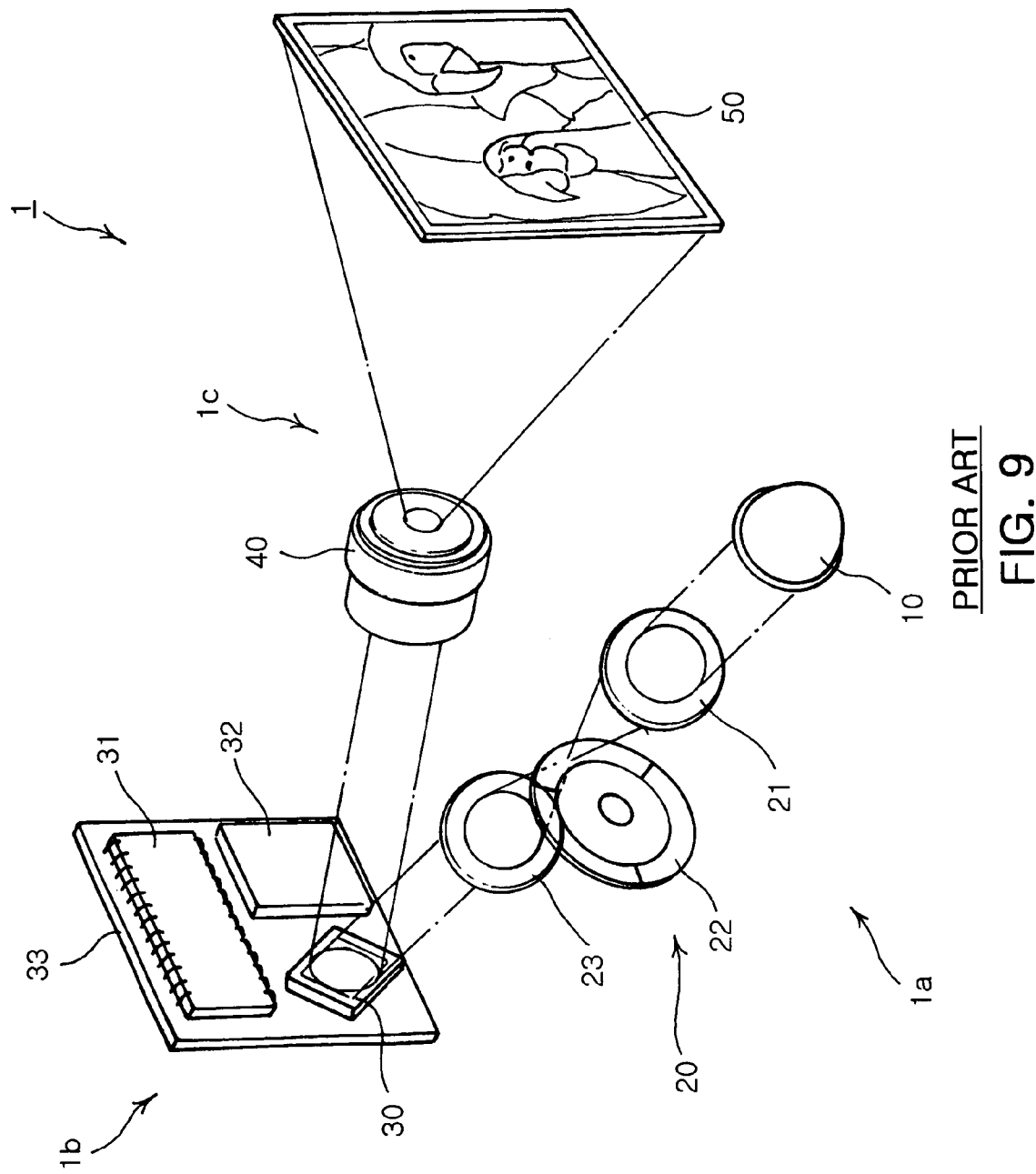
FIG. 9 is a view illustrating the structure of a conventional DLP type system.

The reflecting mirror tilting actuator 100 with the above-stated construction according to the present invention is mounted to the DMD 30, on which a plurality of reflecting mirrors are disposed in two dimensions, for each reflecting mirror M serving to reflect light illuminated from the illuminating optical system 1a through switching between the ON and OFF states according to image signals, as shown in FIG. 9.

As shown in FIGS. 1 and 2A to 2C, the reflecting mirror M is disposed on the horizontal part 123 of the mirror holder 120 mounted in the inner space of the base 110. The reflecting mirror M is resiliently supported upward by the plurality of resilient members 126 disposed on the upper surface of the horizontal part 123.

The reflecting mirror M, whose outer frame is engaged with the inner step 134a of the mirror stopper 132, is disposed between the horizontal part 123 of the mirror holder 120 and the cover 131, which are vertically attached to each other by the plurality of screw members 139. At this time, the lower surface of the cover 131 is in surface contact with the upper surface of the horizontal part 123 while the predetermined gap G is formed between the lower surface of the mirror stopper 132 and the upper surface of the horizontal part 123 such that the mirror stopper 132 can be moved vertically along with the reflecting mirror M.

At both sides of the mirror holder 120 about the resilient connection part 122 are disposed the actuating member 141, whose upper end contacts the lower surface of the horizontal part 123, for applying an external vertical force to the horizontal part 123 to tilt the horizontal part 123 to a predetermined angle, and the tilting stopper 142, whose upper end contacts another position of the lower surface of the horizontal part 123, when the horizontal part 123 is tilted, for restricting the tilting angle of the horizontal part 123.

In this state, the reflecting mirror M is tilted at high frequency, for example, tilted every 10 µs, by the repetitive vertical reciprocating movement of the actuating member 141 disposed at the mirror holder 120 for switching a route of incident light output from the illuminating optical system 1a between ON and OFF states to reflect the incident light.

If flatness of the reflecting mirror M is above the reference value, i.e., 1.2 µm. The ON/OFF operation for switching the route of light incident to the projection lens 40 is not accurately performed according to image signals. As a result, pictures are not correctly displayed on the screen 50.

Consequently, it is necessary that flatness of the reflecting mirror be accurately adjusted to below 1.2 µm after assembly of the reflecting mirror tilting actuator is completed.

Adjustment of the flatness of the reflecting mirror M is performed by the adjustment screws 152 inserted through the adjustment holes 151 formed at the upper surface of the cover 131 while the lower ends of the adjustment screws 152 are in contact with the upper surface of the mirror stopper 132.

When an operator rotates any one of the adjustment screws 152 disposed on the cover 131 in the direction in which the adjustment screw 152 is tightened, the mirror stopper 132 is moved downward by the pitch corresponding to the tightened amount of the adjustment screw 152, and thus, the reflecting mirror M is also moved downward, since the mirror stopper 132 is disposed between the cover 131 and the horizontal part 123, which are attached to each other, while the predetermined gap G is formed between the mirror stopper 132 and the horizontal part 123, and the reflecting mirror M disposed at the mirror stopper 132 is resiliently supported upward by the resilient member 126.

When the operator rotates the adjustment screw 152 on the cover 131 in the direction in which the adjustment screw 152 is loosened, the mirror stopper 132 is moved upward by the pitch corresponding to the loosened amount of the adjustment screw 152, and thus, the reflecting mirror M is also moved upward.

The vertical movement of the reflecting mirror M is individually performed either at the middle part of each side of the cover 131 where the adjustment screw 152 is disposed or at each corner of the cover 131 where the adjustment screw 152 is disposed such that flatness of the reflecting mirror M is adjusted to below 1.2 am.

The flatness of the reflecting mirror M adjusted by the adjustment screw 152 is measured by a measuring device, such as a vibrometer. The measured value is compared with the flatness of the reflecting mirror M before the adjustment. The adjustment screw 152, whose adjustment is completed, is securely fixed to the cover 131 by a bonding agent at the final assembling stage.

As described above, the adjustment of the flatness of the reflecting mirror M is performed on the DMD 30, at which the reflecting mirror tilting actuator 100 is disposed as well as the reflecting mirror M. Consequently, the flatness adjustment is more easily and conveniently performed.

When the user tightens or loosens the adjustment screw 152 inserted through the adjustment hole 151 of the cover 131 to adjust the flatness of the reflecting mirror M, the tightening force or the loosening force of the adjustment screw 152 is not transmitted to the actuating member 141 and the tilting stopper 142. Consequently, the strength of an external force vertically applied to the horizontal part 123 or the contact positions between the horizontal part 123 and the actuating member 141 and between the horizontal part 123 and the tilting stopper 142 is prevented from being changed due to displacement of the actuating member 141 and the tilting stopper 142, and therefore, the tilting characteristics are constantly maintained.

As apparent from the above description, the present invention has the following effects. The adjustment screw, whose lower end contacts the upper surface of the mirror stopper disposed between the cover and the mirror holder for surrounding the reflecting mirror, is inserted through the screw hole of the cover, and the position of the mirror stopper is changed by decreasing or increasing the gap between the cover and the mirror holder through the tightening or loosening operation of the adjustment screw. Consequently, the present invention has the effect of conveniently and quickly adjusting flatness of the reflecting mirror on the cover.

Furthermore, the reflecting mirror tilting actuator is assembled while the horizontal adjusting unit, which generates the loosening force and the tightening force to adjust flatness of the reflecting mirror, and the tilting unit, which generates the vertical external force to tilt the reflecting mirror to the predetermined angle, are separated from each other, and therefore the actuating member and the tilting stopper are prevented from being displaced due to the external force. Consequently, the present invention has the effect of constantly tilting the reflecting mirror to the predetermined tinting angle and constantly stopping the reflecting mirror at the predetermined stop position, and therefore, improving reliability of the product.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An actuator for tilting a reflecting mirror disposed, in a digital light processing (DLP) projection system, such that the reflecting mirror changes a reflecting angle of the light according to an image signal, wherein the actuator comprises:
    a base having an inner space defined therein;
    a mirror holder comprising a fixing part fixed to the base, and a horizontal part integrally connected with the fixing part by a resilient connection part, the mirror holder being provided with at least one resilient member for resiliently supporting the reflecting mirror upward;
    a mirror supporting unit comprising a cover attached to an upper surface of the horizontal part, and a mirror stopper disposed between the horizontal part and the cover while surrounding a frame of the reflecting mirror;
    a tilting unit comprising an actuating member, whose upper end comes into contact with the horizontal part, for transmitting vertical reciprocating movement to the horizontal part, and a tilting stopper, whose upper end comes into contact with the horizontal part, for restricting the tiling angle of the horizontal part; and
    a horizontal adjusting unit comprising at least one adjustment screw, whose lower end contacts the mirror stopper through at least one adjustment hole formed at the cover such that the mirror stopper spaced apart by a predetermined gap from the horizontal part is exposed upward through the adjustment hole, for adjusting flatness of the reflecting mirror.

2. The actuator as set forth in claim 1, wherein the base is provided at a bottom surface thereof with circular protrusions for fixing the position of the mirror holder, and insertion holes for allowing the actuating member and the tilting stopper to be inserted therethrough.

3. The actuator as set forth in claim 1, wherein the resilient connection part is disposed between an upper end of an fixing part and a lower surface of the horizontal part, the resilient connection part having a thickness less than that of the upper end of the fixing part.

4. The actuator as set forth in claim 1, wherein the horizontal part is provided at the corners thereof with a plurality of screw holes for allowing screw members for attaching the cover to the horizontal part to be inserted therethrough.

5. The actuator as set forth in claim 1, wherein the horizontal part has at least one cutout part formed by cutting at least one corner.

6. The actuator as set forth in claim 5, wherein the at least one cutout part comprises a plurality of cutout parts arranged while being bilaterally symmetrical to each other about a center line of the upper surface of the horizontal part.

7. The actuator as set forth in claim 1, wherein the horizontal part is provided at a upper surface thereof with a location part having the same shape as the reflecting mirror, the location part having a predetermined depth.

8. The actuator as set forth in claim 1, wherein the horizontal part is provided at the lower surface thereof with a hollow guide member for guiding the vertical reciprocating movement of the actuating member.

9. The actuator as set forth in claim 1, wherein the horizontal part is provided at the lower surface thereof with a touch member whose lower surface contacts an upper end of the tilting stopper.

10. The actuator as set forth in claim 9, wherein the touch member is provided at the lower surface thereof with a groove corresponding to the upper end of the tilting stopper.

11. The actuator as set forth in claim 1, wherein the horizontal part is provided at the lower surface thereof with a groove corresponding to an upper end of the tilting stopper.

12. The actuator as set forth in claim 1, wherein an upper end of the tilting stopper is round.

13. The actuator as set forth in claim 1, wherein the actuating member comprises a piezoelectric element whose upper end is vertically reciprocated to a predetermined height along the flow direction of electric current when the piezoelectric element is supplied with the electric current.

14. The actuator as set forth in claim 1, wherein
    the actuating member is provided at an upper end thereof with a cap having a semicircular section, and
    the horizontal part is provided at the lower surface thereof with a contact groove having a semicircular section, the cap being engaged in the contact groove while the cap is in surface contact with the contact groove.

15. The actuator as set forth in claim 1, wherein the cover has an opening for allowing the reflecting mirror to be exposed therethrough, and the opening is provided at an inner surface thereof with an inner engaging protrusion, the inner engaging protrusion being engaged with an outer frame of the mirror stopper.

16. The actuator as set forth in claim 1, wherein the mirror stopper has an opening for allowing the reflecting mirror to be exposed therethrough, the opening being provided at an inner surface thereof with an inner step for engaging with an outer frame of the reflecting mirror, and the mirror stopper is provided at an outer surface thereof with an outer step for engaging with an cover.

17. The actuator as set forth in claim 1, wherein the at least one adjustment hole comprises a plurality of adjustment holes formed at the middle parts of the sides of the cover, respectively.

18. The actuator as set forth in claim 1, wherein the at least one adjustment hole comprises a plurality of adjustment holes formed at the corners of the cover, respectively.

19. The actuator as set forth in claim 17, wherein the plurality of adjustment holes are arranged in bilateral symmetry.

* * * * *